3 Sheets--Sheet 1.

J. PENNYPACKER.

Horse-Rake.

No. 6,471.

Reissued June 1, 1875.

Witnesses.

Robert H. Duncan.

Geo. A. Smith

Inventor.

John Pennypacker.

per Fisher & Duncan attys.

THE GRAPHIC CO. PHOTO-LITH. 39 & 41 PARK PLACE, N.Y.

3 Sheets--Sheet 2.

J. PENNYPACKER.

Horse-Rake.

No. 6,471. Reissued June 1, 1875.

*Witnesses:*

Robert H. Duncan.

Benj. A. Smith

*Inventor:*

John Pennypacker.

per Fisher & Duncan

Attys.

THE GRAPHIC CO. PHOTO-LITH. 38 & 41 PARK PLACE, N.Y.

3 Sheets--Sheet 3.

J. PENNYPACKER.

Horse-Rake.

No. 6,471.

Reissued June 1, 1875.

Witnesses:
Robert H. Duncan
Benj. A. Smith

Inventor:
John Pennypacker.
per Fisher & Duncan
Attys.

THE GRAPHIC CO. PHOTO-LITH. 39 & 41 PARK PLACE, N.Y.

UNITED STATES PATENT OFFICE.

JOHN PENNYPACKER, OF RIDLEY PARK, PENNSYLVANIA.

IMPROVEMENT IN HORSE-RAKES.

Specification forming part of Letters Patent No. 46,583, dated February 28, 1865; reissue No. 6,471, dated June 1, 1875; application filed July 2, 1874.

*To all whom it may concern:*

Be it known that I, JOHN PENNYPACKER, of Ridley Park, county of Delaware and State of Pennsylvania, have invented certain new and useful Improvements in Horse-Rakes, of which the following is a specification:

This invention relates to that class of horse-rakes in which the draft of the team, in contradistinction to the power exerted by the driver, is made to discharge, or aid in discharging, the accumulated hay or grain; and it consists, first, in so mounting and arranging the rake-teeth, as hereinafter set forth, that they may all be lifted together by the partial rotation of the axle, or may play up and down independently of each other, to accommodate themselves to the inequalities of the ground, and at the same time be firmly supported against lateral strain by supports applied in rear of the points at which the teeth are respectively pivoted; secondly, in the use of devices so constructed and arranged that the two supporting-wheels will co-operate in lifting the teeth when the machine is moving straight forward, or either one of the wheels will perform the work alone whenever the machine is changing direction; third, in the shipping and unshipping devices, by means of which, as hereinafter described, the supporting-wheels are made to operate the rake.

The invention is fully illustrated in the accompanying drawings, in which—

Figure 1:
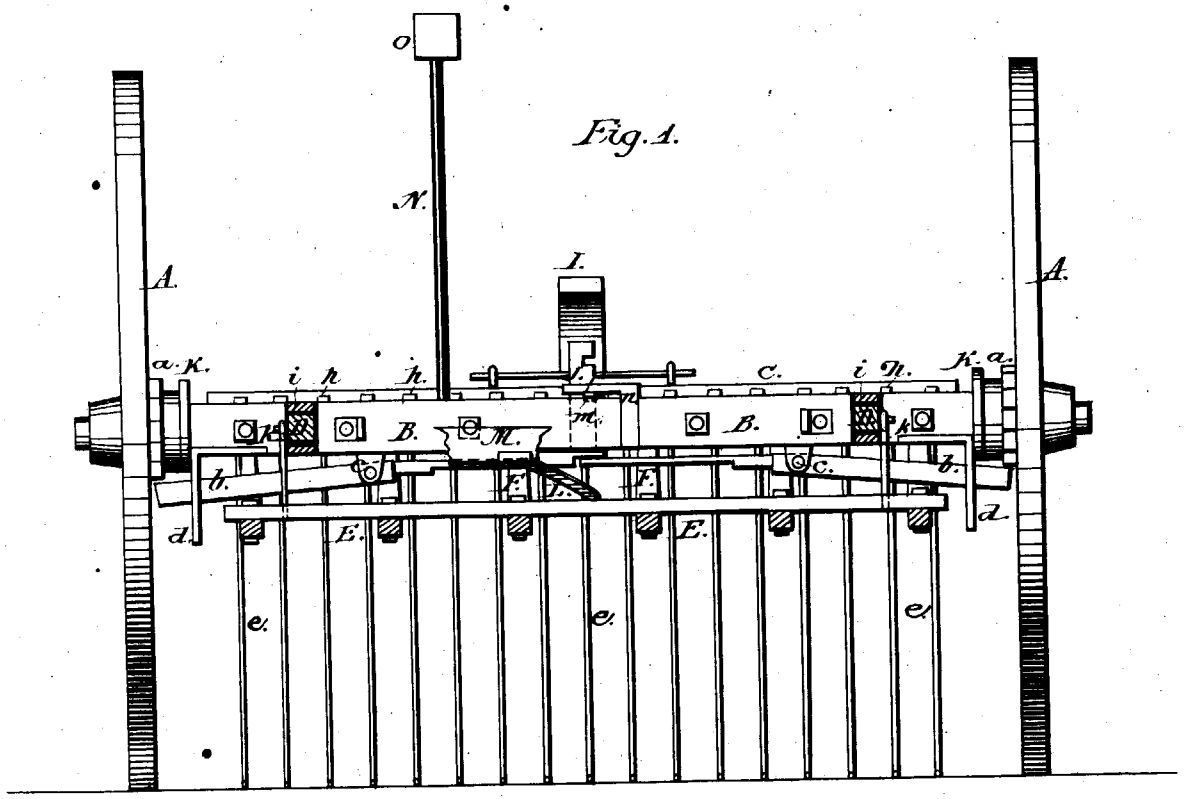
Figure 2:
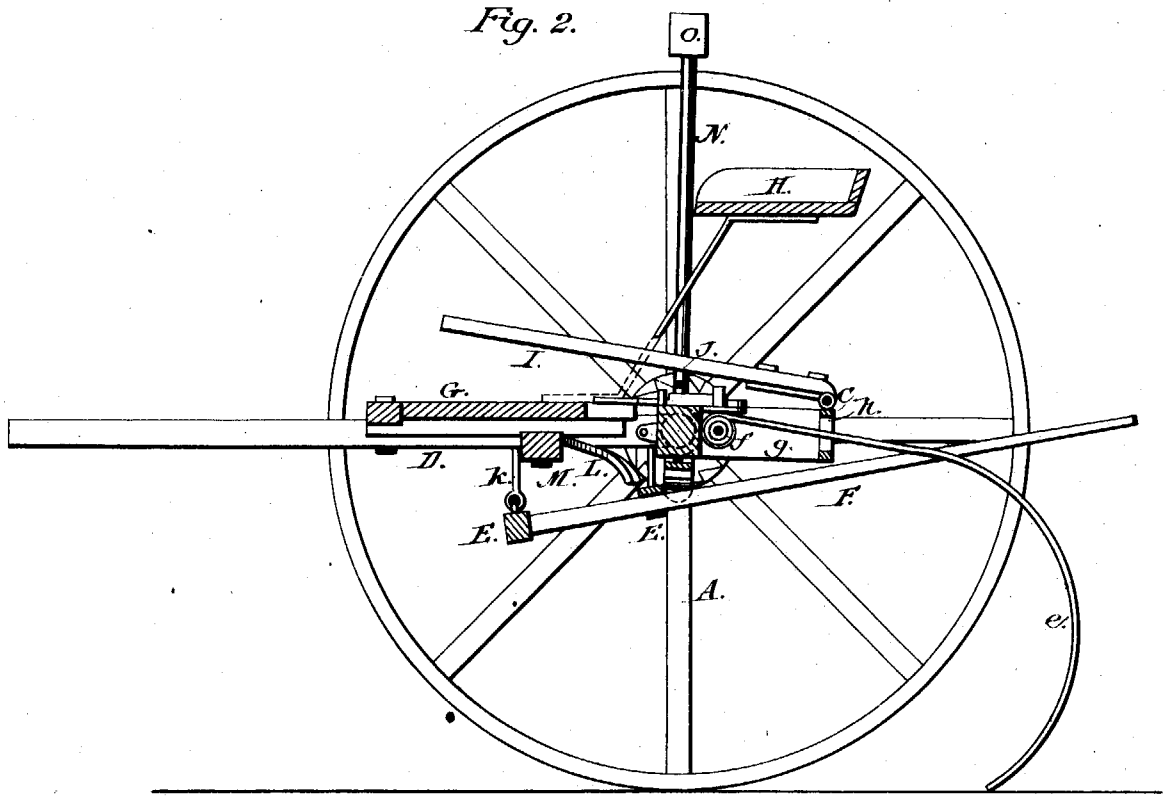
Figure 3:
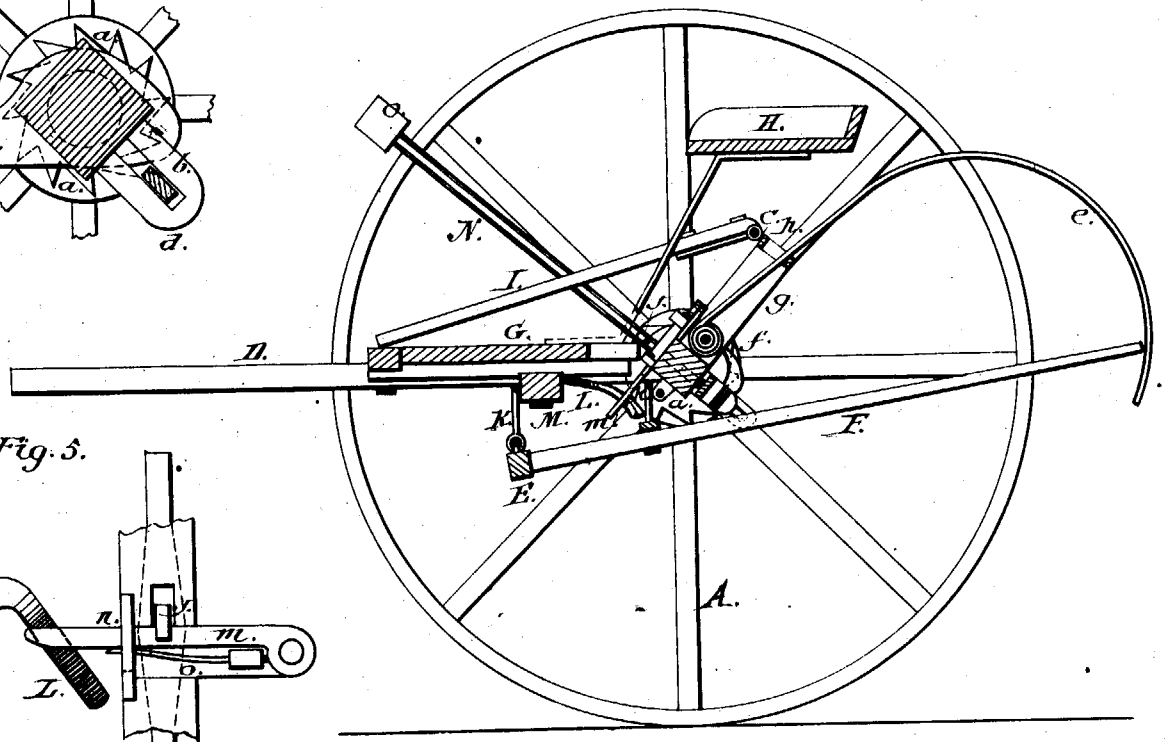
Figure 4:
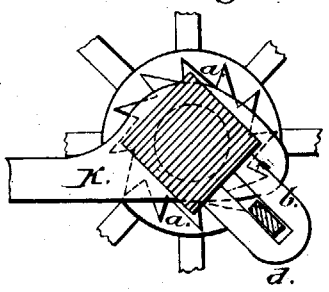
Figure 5:
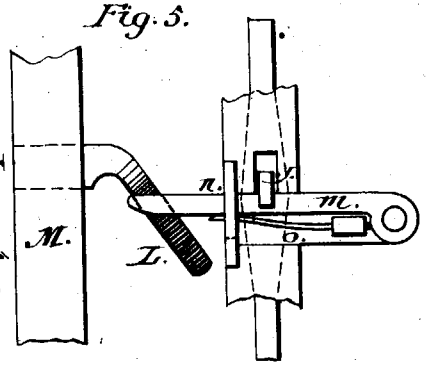

Figure 1 is a transverse sectional elevation of the improved machine. Fig. 2 is a longitudinal sectional elevation, showing the teeth upon the ground. Fig. 3 is a longitudinal sectional elevation, showing the teeth elevated for discharging the hay. Fig. 4 is a sectional elevation on an enlarged scale, showing the action of the cam-plates in effecting the disengagement of the locking-pawls from the ratchets upon the inner faces of the wheels. Fig. 5 is a plan view of the locking devices for securing the engagement of the pawls with the ratchets during the raising of the rake.

The supporting-wheels A A turn loosely upon the axle B; but the inner portion of each hub is provided with a ratchet, *a*, while there are attached to the under side of the axle two spring lever-pawls, *b b*, so arranged with relation to the ratchets that the wheels can, at the will of the operator, be locked fast to the axle. These lever-pawls are pivoted at *c c*, and their inner ends are made thin enough to be flexible, so as to permit either pawl to be thrown out of engagement with the ratchet whenever, in backing, the inclined face of the ratchet-teeth is caused to bear upon the pawl. The outer ends of the pawls are supported laterally by stirrups *d d*. The curved rods or rake-teeth *e e* are secured to the rod *f*, which constitutes the rake-head, and this in turn is rigidly secured to the axle on its rear side, and arranged behind the axle; and rigidly connected thereto by means of the arms *g g* is the bar C, which is provided with a series of narrow vertical slots, *h h*, one to each tooth, the object of this bar being to lift the rake-teeth simultaneously when the axle is rocked, and to depress the teeth when the axle is returned to its normal position, the slots at the same time affording lateral support to the individual teeth, and also giving them, within the necessary range, the capacity of independent vertical play, to pass obstructions or to conform to the inequalities of the ground. The draft-frame D is connected to the axle by means of iron straps *i i* passing around cylindrical portions of the axle. Attached to the draft-frame by means of links *k k* is a frame, E, from which project rearward, between the rake-teeth, the clearing-fingers or strippers F F, which operate in the usual manner. Upon the draft-frame is also mounted a foot-board, G, and a driver's seat, H. Hinged to the lifting-bar C is a lever, I, within easy reach of the driver's foot, and projecting through the axle, in such a position that its upper end is directly beneath this lever, is a notched plate, J, the lower end of the same resting upon the inner ends of the spring lever-pawls *b b*, as shown in Fig. 1. Pivoted to the upper side of the axle, or to an arm projecting therefrom, is a latch, *m*, held upon the face of the axle by the guide *n*, and kept in contact with the edge of the notched plate J, or caused to enter the notch therein, by means of the spring *o*.

Attached to the draft-frame, and embracing the axle at each end, just inside of the wheels, are two cam-plates, K K, so shaped as to bear against the pawls *b b*, and throw them out of engagement with the ratchets when the axle is rotated into the position shown in Fig. 4. L is an inclined stop projecting from the cross-piece M, and arranged diagonally to the axle, in such position as to press the spring-latch *m* sidewise, and throw it out of the notch in the edge of the plate J whenever the axle is rotated into the position shown in Fig. 3. N is a standard projecting from the upper face of the axle for receiving the adjustable weight O. The design of this weight is to counter-balance to any desired extent the weight of the rake-teeth, so as to prevent them from striking upon the ground with too heavy a shock.

The operation of the machine is as follows: When the rake has gathered a sufficient quantity of hay or grain, and the driver wishes to discharge it, he presses with his foot upon the lever I, and thereby forces down the notched plate J, which in turn depresses the inner ends of the lever-pawls *b b*, and throws up the outer ends into engagement with the ratchets *a a*. As the plate J descends the spring-latch *m* is forced into the notch in the edge of the plate, and thus the pawls are prevented from becoming disengaged from the ratchets by any mere jolting or shaking of the machine. As the wheels move forward the engagement of the pawls with the ratchets causes the axle to rotate with the wheels until the rake-teeth are lifted into the position shown in Fig. 3, the hay or grain being stripped from the rake by the fingers F F, and discharged upon the ground. As the axle continues to revolve, the pawls, striking against the cam-plates K K, are forced out of engagement with the ratchet-teeth, when the rake will be returned to its normal position by its own weight. As the rake approaches the limit of its upward motion, the end of the lever *m* strikes against the inclined stop L, which forces the lever out of the notch in the plate J, this plate J being at once forced up to its original position by the elasticity of the inner ends of the levers *b*. As the inner end of each of the levers *b b* is a spring, the pawl will slip over the teeth of the ratchet whenever the corresponding wheel is backing, or one wheel is going slower than the other. Consequently the rake may be raised when the machine is in the act of turning a corner, when one wheel is standing stationary or moving backward, as readily as when the machine is moving straight forward.

What is claimed as new is—

1. The combination, in a horse-rake, of a rocking axle operated by the forward motion of the wheels, rake-teeth separately hinged to the rake-head, and teeth-supports arranged behind the axle, and rigidly connected thereto, substantially as shown and described, so as to support the teeth when in action against lateral strain, and raise them in a body when the axle is rocked for discharging the load.

2. In combination with each of the supporting-wheels of a horse-rake, a ratchet and pawl constructed and arranged to operate substantially as described, so that the two wheels may act in concert to raise the rake when both wheels are advancing, or independently when the machine is turning corners or changing direction.

3. In combination with the notched plate J and the latch *m*, the lever I for depressing said plate.

JOHN PENNYPACKER.

Witnesses:

DAVID BEITLER,

W. K. SHRYOCK.